Patented May 3, 1938

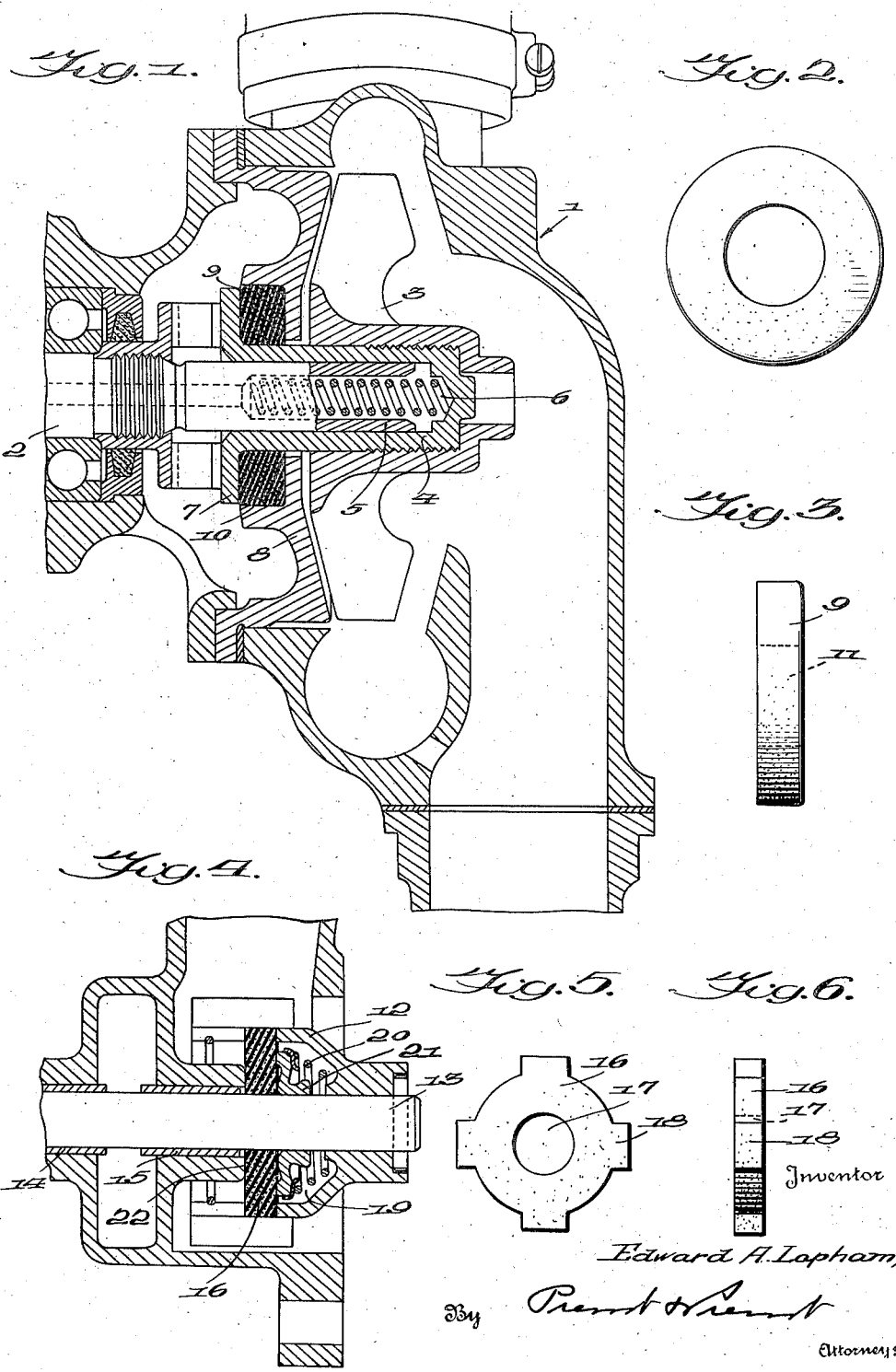

2,116,397

UNITED STATES PATENT OFFICE 2,116,397

SEAL FOR ROTARY SHAFTS

Edward A. Lapham, Long Island City, N. Y.

Application November 19, 1936, Serial No. 111,716

2 Claims. (Cl. 288—1)

My invention consists in new and useful improvements in seals for rotary shafts and relates more particularly to seals for use in connection with the water circulating pumps of internal combustion engines and the like.

It is the object of my invention to provide a seal of this nature composed of carbon, graphite, or carbon-graphite material impregnated with metal.

Another object is to provide a metal impregnated carbon seal member possessing a reduced co-efficient of friction and a maximum of strength and durability. A seal formed of this material quickly develops a high polish on its running face and in turn polishes the face of the material which it contacts, to such an extent as to prevent leakage of water past the seal when a normal pressure is applied to maintain the two sealing faces together.

Heretofore, carbon and graphite seals have been employed for various purposes but it is to be noted that when carbon and graphite materials are pressed as a dry substance or in a plastic state, they must be heat treated at high temperatures in order to set the binders. In this heat treating, certain of the binders and other volatile materials are driven off, leaving a porous structure which, when used as a seal, will permit seepage or leakage of liquid through its pores and past the sealing member. Furthermore, a seal thus constructed has definite limitations as to strength, and has limited wearing qualities, and its co-efficient of friction is a set factor.

I have found that by employing as a seal for the use herein specified, a member formed of carbon or graphite impregnated with metal, the pores of the material are definitely sealed by the metal, against leakage of liquid, and this is of particular importance when the seal is used for automobile pumps or the like.

A further advantage of my invention lies in the fact that certain compositions of carbon, graphite, or carbon-graphite and metal, can be produced which are impervious to antifreeze solutions such as used in internal combustion engines which, in the past, have destroyed many packings.

A still further advantage of my invention is that due to the antifriction qualities and the highly polished surface developed, lubrication of the sealing and bearing faces is unnecessary.

With the above and other objects in view which will appear as the description proceeds, my invention resides in the novel features herein set forth, illustrated in the accompanying drawing and more particularly pointed out in the appended claims.

Referring to the drawing,

Fig. 1 is a sectional view showing the application of one form of my improved seal.

Fig. 2 is a plan view of the seal shown in Fig. 1.

Fig. 3 is a view in side elevation.

Fig. 4 is a sectional view showing a second form of seal in a different application.

Fig. 5 is a plan view of the seal shown in Fig. 4, and

Fig. 6 is a view in side elevation thereof.

Referring to Fig. 1, numeral 1 designates generally the circulating pump of an internal combustion engine having a rotary shaft 2 carrying at one end an impeller 3. The impeller in the form shown is mounted on a sleeve member 4 which slidably embraces the hollowed end 5 of the shaft 2 and is closed at one end to engage the end of a coil spring 6, and terminates at its opposite end in a radially extending flange 7.

Between the flange 7 and the stationary wall 8 of the pump, I apply one of my improved metal impregnated carbon seals 9 which fits within a recess 10 in the wall 8. This seal is annular in shape as shown in Fig. 2, having a central opening 11 which closely engages the sleeve 4, the outer face of said seal embracing the flange 7. The spring 6 normally tends to force the sleeve 4 outwardly on the shaft 2, thus causing a constant pressure engagement between the adjacent faces of the flange 7 and the seal 9.

Due to the composition of the seal 9, its sealing face acquires a high polish after a short use, thus minimizing frictional resistance and at the same time providing a maximum sealing engagement. As before stated, the pores in the carbon are filled and sealed by the metal with which it is impregnated, thus prohibiting leakage through the seal member itself.

In this form of my invention the seal 9 is preferably held stationary within the recess 10 in the wall 8, sleeve 4 and flange 7 rotating with the shaft 2.

In Fig. 4 I have shown another form of application of my improved seal wherein the seal rotates and the adjacent sealing surface remains stationary.

Referring to this figure, 12 represents the rotary member of a circulating pump mounted on a rotating shaft 13 supported in bearings 14 and 15. The sealing member 16 of a similar composition of carbon impregnated with metal, is mounted on the shaft 12 with its aperture 17 closely embracing the shaft. In this particular form, the seal is designed to accommodate the impeller and is provided with projecting ears 18 which fit in suitable recesses in the impeller and cause the seal to rotate therewith.

A portion of the impeller adjacent one face of the seal is hollowed as at 19 to form a spring chamber which receives the coil spring 20, said spring being interposed between the wall of the chamber and a spring adapter 21 which abuts the face of the seal. The opposite face of the seal rotatably engages the projected annular face 22 of the bearing 15 against which it is forced by the pressure of spring 20, thus maintaining a seal at this point.

As in the structure just described, the sealing face of the member 16 acquires a high polish which reduces frictional engagement and increases the effectiveness of the sealing surfaces.

In the preparation of my improved sealing members, it is to be noted that the material is strengthened and toughened by forming a network of metal throughout the entire porous area of the material, the strength being determined by the kind of metal used, and the porosity of the carbon. Furthermore, I am able to vary the co-efficient of friction of the seal by using various metal impregnants. For example, a given grade of carbon impregnated with copper will have a higher co-efficient of friction than one impregnated with lead.

In the manufacture of the seals forming the basis of my invention, the carbonaceous material is pressed together with a suitable binder under high pressure and then kilned, the latter operation driving off the binding material of the ingredients and leaving a porous structure. This structure is then impregnated by any suitable method with molten metal introduced under pressure sufficient to thoroughly fill the pores and form a strengthening network throughout the seal, which not only increases its tensile strength many times, but also increases the wearing qualities of the material. Furthermore, depending upon the type of metal used as the impregnant, the co-efficient of friction of the seal may be lowered or increased as desired.

While I have shown and described the foregoing applications of my metal impregnated carbon seal, it is to be understood that I do not intend to limit myself to the forms shown, they being merely examples of many possible adaptations. What I do intend to cover in the following claims is the use of a seal for circulating pumps or the like, which seal is composed of carbon impregnated with metal, forming a bearing and sealing surface which requires no lubrication and which acquires a highly polished sealing face.

From the foregoing it is believed that the construction and advantages of my invention may be readily understood by those skilled in the art without further description, it being borne in mind that numerous changes may be made in the details disclosed without departing from the spirit of my invention as set out in the following claims.

What I claim and desire to secure by Letters Patent is:—

1. A seal of the class described consisting of a body portion composed of compressed carbonaceous material which has been rendered porous as the result of driving off a substantial portion of the binder material during a subsequent heat treatment, said body portion being reinforced by impregnating the same with molten metal introduced under pressure and in sufficient quantity to form a strengthening network throughout.

2. A seal of the class described consisting of a body portion composed of compressed carbonaceous material which has been rendered porous as the result of driving off a substantial portion of the binder material during a subsequent heat treatment, said body portion being reinforced and rendered impervious to fluids, by filling and sealing the porous structure thereof with molten metal introduced under pressure and in sufficient quantity to form a strengthening network throughout.

EDWARD A. LAPHAM.